United States Patent
Sauro et al.

(10) Patent No.: US 10,404,070 B2
(45) Date of Patent: Sep. 3, 2019

(54) PHOTOVOLTAIC APPARATUS

(71) Applicant: ABB Schweiz AG, Baden (CH)

(72) Inventors: Macerini Sauro, Bucine (IT); Matti Jussila, Helsinki (FI); Mikko Myller, Helsinki (FI); Tomi Riipinen, Helsinki (FI)

(73) Assignee: ABB Schweiz AG, Baden (CH)

( * ) Notice: Subject to any disclaimer, the term of this patent is extended or adjusted under 35 U.S.C. 154(b) by 167 days.

(21) Appl. No.: 15/283,906

(22) Filed: Oct. 3, 2016

(65) Prior Publication Data

US 2018/0097367 A1  Apr. 5, 2018

(51) Int. Cl.
| | |
|---|---|
| H02J 3/38 | (2006.01) |
| H02J 3/46 | (2006.01) |
| H02J 7/35 | (2006.01) |
| H02S 40/30 | (2014.01) |
| H02J 1/10 | (2006.01) |
| H02J 4/00 | (2006.01) |
| H02J 9/06 | (2006.01) |

(52) U.S. Cl.
CPC .............. *H02J 3/383* (2013.01); *H02J 1/102* (2013.01); *H02J 3/46* (2013.01); *H02J 7/35* (2013.01); *H02S 40/30* (2014.12); *H02J 4/00* (2013.01); *H02J 9/061* (2013.01); *Y02B 10/72* (2013.01); *Y02E 10/563* (2013.01); *Y02E 10/566* (2013.01)

(58) Field of Classification Search
CPC .... H02J 3/383; H02J 1/102; H02J 3/46; H02J 7/35; H02J 9/061; H02J 4/00; H02S 40/30
See application file for complete search history.

(56) References Cited

U.S. PATENT DOCUMENTS

| | | | |
|---|---|---|---|
| 2006/0139975 A1* | 6/2006 | Huang | G06F 1/30 363/65 |
| 2011/0148194 A1 | 6/2011 | Lai et al. | |
| 2016/0006253 A1 | 1/2016 | Saussele et al. | |
| 2016/0099572 A1 | 4/2016 | Gupta et al. | |
| 2017/0271875 A1* | 9/2017 | Narla | H02J 3/383 |

OTHER PUBLICATIONS

European Patent Office, International Search Report & Written Opinion issued in corresponding Application No. PCT/EP2017/074655, dated Dec. 4, 2017, 15 pp.

* cited by examiner

*Primary Examiner* — Rexford N Barnie
*Assistant Examiner* — Thai H Tran
(74) *Attorney, Agent, or Firm* — Taft Stettinius & Hollister LLP; J. Bruce Schelkopf

(57) ABSTRACT

Photovoltaic apparatus comprising an auxiliary power supply arrangement which is adapted to feed an electric load of the photovoltaic apparatus itself and comprises: first electronic means connected with a DC power source and comprising a first electronic unit adapted to receive a first feeding voltage and provide a first output voltage of DC type; second electronic means connected with an AC power source and comprising a second electronic unit adapted to receive a second feeding voltage and provide a second output voltage of DC type; and third electronic means connected with the first and second electronic means and adapted to reversibly switch among different operation states based on the status of the electric power sources.

15 Claims, 9 Drawing Sheets

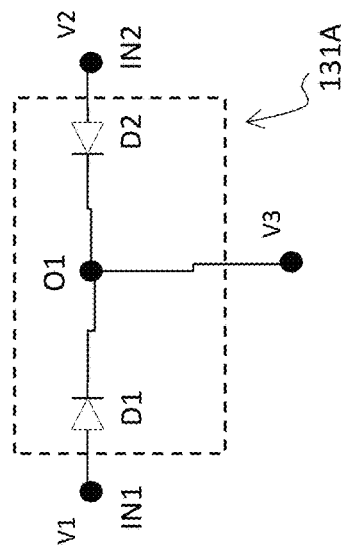
FIG. 6
FIG. 6A
FIG. 6B

PHOTOVOLTAIC APPARATUS

TECHNICAL FIELD

The present disclosure relates to the field of photovoltaic apparatuses for electric power generation.

More particularly, the present disclosure relates a photovoltaic apparatus equipped with an improved auxiliary power supply arrangement to feed electric or electronic components of said photovoltaic apparatus with an auxiliary power supply.

BACKGROUND

As is known, a photovoltaic apparatus comprises electric or electronic components (hereinafter in general defined as "electric loads") which, in operation, need to be fed by an auxiliary power supply.

Typically, such an auxiliary power supply is provided by a dedicated electronic unit capable of harvesting electric power from the AC grid fed by the photovoltaic apparatus.

As is known, technical regulations require that a photovoltaic apparatus is able to operate for a relatively long period of time (ride-through time, typically equal to 1.5 s) in case of failures of the AC grid.

The provision of such a prolonged safety time interval resides in the need of allowing the photovoltaic apparatus (in particular the main power converter thereof) to implement suitable control strategies to overcome possible temporary outages of the AC grid (without interrupting its operation) or switch off in a safe manner in case of faults of the AC grid.

In order to meet these regulatory requirements, a photovoltaic apparatus might include an auxiliary power supply arrangement equipped with suitably sized energy storage means (e.g. batteries or capacitors banks) to provide the electric energy needed to operate for at least the required ride-through time.

As an alternative, a photovoltaic apparatus might include a UPS system adapted to intervene in case of failures of the AC grid.

However, as it is easy to understand, both these solutions entail remarkable disadvantages in terms of increase of the overall size and costs of the photovoltaic apparatus.

As is known, in some countries (e.g. in the USA), recent technical regulations have been introduced, which require that a photovoltaic apparatus is equipped with a protection device (e.g. a so-called RSD—Rapid Shut-down Device) capable of de-energizing the DC section (in particular the photovoltaic panels) of the photovoltaic apparatus upon a manual intervention or in case of failure of the AC grid (within a given intervention time—e.g. 10 s). Typically, these protection devices are configured as contactors configured to automatically disconnect the photovoltaic panels from the main power inverter upon a manual intervention or when an auxiliary power supply is no more present.

As it is easy to understand, in case of outages of the AC grid, also these protection devices need to be suitably fed for at least for the above mentioned ride-through time to avoid their immediate intervention and ensure a proper operation of the photovoltaic apparatus.

Of course, this fact entails an increase of the overall energy consumption of the photovoltaic apparatus during the ride-through time, which renders the above mentioned problems even more critical.

Hence, there is a need to provide a photovoltaic apparatus suitable for facing the above mentioned issues.

SUMMARY

This need is fulfilled by a photovoltaic apparatus comprising an auxiliary power supply arrangement adapted to feed an electric load of said photovoltaic apparatus, said auxiliary power supply arrangement comprising:
first electronic means electrically connected with a first electric power source of DC type, said first electronic means comprising a first electronic unit adapted to receive a first feeding voltage and provide a first output voltage of DC type;
second electronic means electrically connected with a second electric power source of AC type, said second electronic means comprising a second electronic unit adapted to receive a second feeding voltage and provide a second output voltage of DC type;
third electronic means electrically connectable with said electric load and electrically connected with said first and second electronic means to receive said first and second output voltages from said first and second electronic means, said third electronic means comprising a third electronic unit adapted to reversibly switch among:
a first operation state at which said third electronic unit selects said second output voltage and feeds said electric load with a third output voltage, which is equal to or depends on said second output voltage;
a second operation state at which said third electronic unit selects said first output voltage and feeds said electric load with a third output voltage which is equal to or depends on said first output voltage;
a third operation state at which said third electronic unit interrupts the feeding of said electric load;
said third electronic unit being adapted to switch from one operation state to another depending on the operating status of said first and second electric power sources.

In a further aspect, the present disclosure relates to an auxiliary power supply arrangement for a photovoltaic apparatus, wherein the auxiliary power supply arrangement comprises:
first electronic means electrically connectable with a first electric power source of DC type, said first electronic means comprising a first electronic unit adapted to receive a first feeding voltage and provide a first output voltage of DC type;
second electronic means electrically connectable with a second electric power source of AC type, said second electronic means comprising a second electronic unit adapted to receive a second feeding voltage and provide a second output voltage of DC type;
third electronic means electrically connectable with said electric load and electrically connected with said first and second electronic means to receive said first and second output voltages from said first and second electronic means, said third electronic means comprising a third electronic unit adapted to reversibly switch among:
a first operation state at which said third electronic unit selects said second output voltage and feeds said electric load with a third output voltage which is equal to or depends on said second output voltage;
a second operation state at which said third electronic unit selects said first output voltage and feeds said electric load with a third output voltage which is equal to or depends on said first output voltage;

a third operation state at which said third electronic unit interrupts the feeding of said electric load;

said third electronic unit being adapted to switch from one operation state to another depending on the operating status of said first and second electric power sources.

BRIEF DESCRIPTION OF THE FIGURES

Characteristics of the present disclosure will be more apparent with reference to the description given below and to the accompanying figures, provided purely for explanatory and non-limiting purposes, wherein FIGS. 1-6, 6A-6B, 7A-7C schematically illustrate relevant aspects of the photovoltaic apparatus, according to the present disclosure.

FIG. 6 illustrates an embodiment of a selection circuit.

FIG. 6A illustrates an embodiment of a selection circuit.

FIG. 6B illustrates an embodiment of a selection circuit.

DETAILED DESCRIPTION OF THE ILLUSTRATIVE EMBODIMENTS

Figure 1:
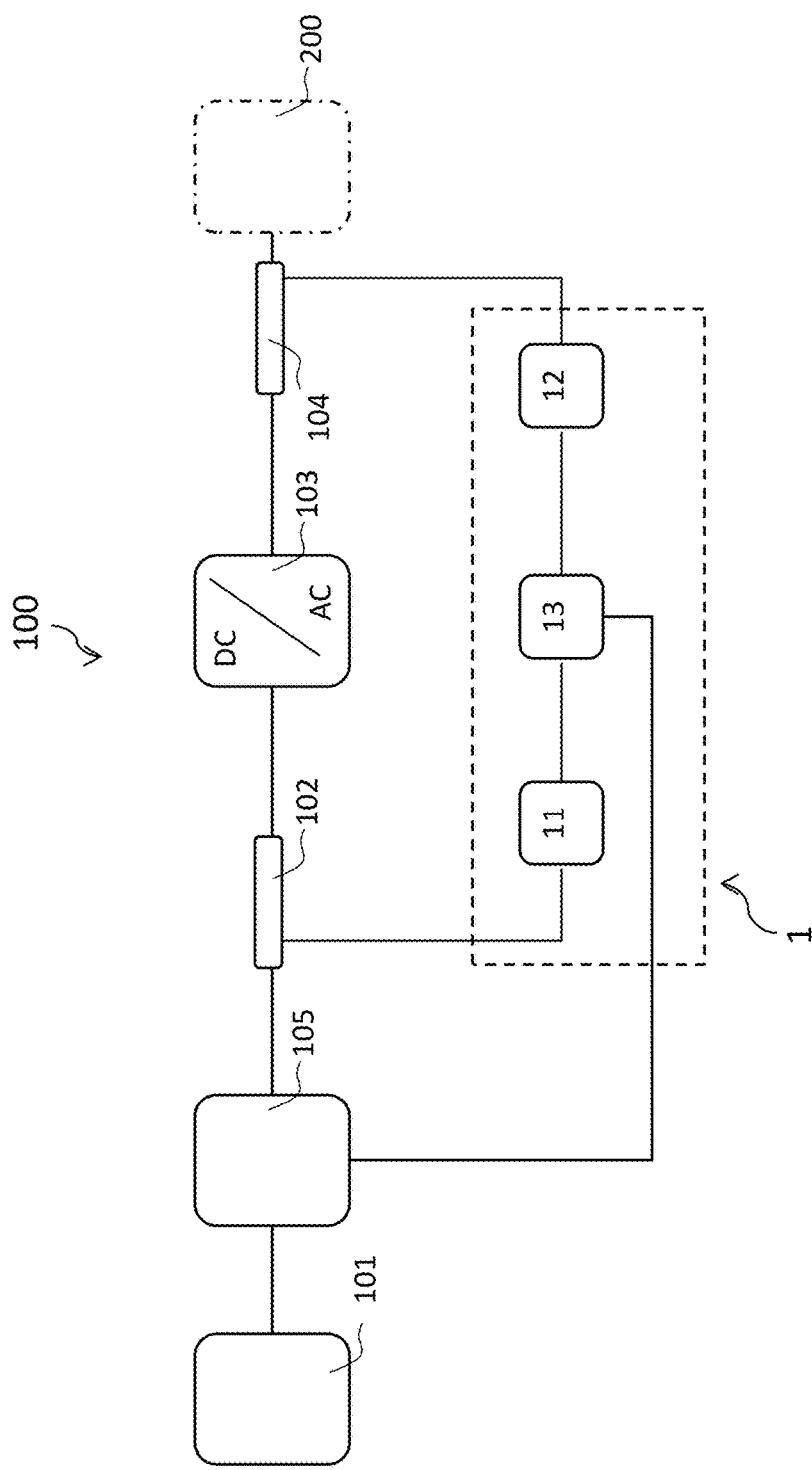
FIG. 1 illustrates an embodiment of a photovoltaic apparatus.

With reference to the aforesaid figures, the present disclosure relates to a low voltage photovoltaic apparatus 100 for electric power generation.

For the sake of clarity, it is specified that the term "low voltage" refers to operating voltages lower than 1 kV AC and 1.5 kV DC.

The photovoltaic apparatus 100 comprises a DC section which includes one or more photovoltaic panels 101 and at least a DC electric bus 102 electrically connected with said photovoltaic panels, an inverter section, which includes at least a DC/AC main switching converter 103 electrically connected with the a DC electric bus 102, and an AC section, which includes at least an AC electric bus 104 electrically connected with the DC/AC main switching converter 103 and an electric power distribution grid 200 fed by said photovoltaic apparatus. The mentioned DC section, inverter section and AC section of the photovoltaic apparatus 100 may be of known type and will not be further described in further details for the sake of brevity.

The photovoltaic apparatus 100 comprises one or more electric loads 105 that need to be fed by an auxiliary power supply.

In principle, each electric load 105 may be any electric or electronic component (which may be of known type) of the photovoltaic apparatus.

As an example, an electric load 105 may comprise a protection device 105 (e.g. a RSD device) adapted to perform the de-energization of the DC section 101, 102 of the photovoltaic apparatus 100.

Further types of electric loads of the photovoltaic apparatus, which need to be fed by an auxiliary power supply, may be arranged, according to the needs.

It is evidenced how said loads may be essential for operating the photovoltaic apparatus. For example, they may be arranged to enable power feed from the photovoltaic panels 101 to the electric power distribution grid 200.

According to the disclosure, the photovoltaic apparatus 100 comprises an auxiliary power supply arrangement 1 electrically connectable to the electric load 105 to feed (auxiliary power supply) this latter.

The auxiliary power supply arrangement 1 is electrically connected to a first electric power source 102 of DC type and to a second electric power source 104 of AC type.

Preferably, the first and second electric power sources 102, 104 are voltage sources adapted to provide suitable DC, AC feeding voltages to the auxiliary power supply arrangement 1, respectively.

Conveniently, the DC electric power source 102 is adapted to provide electric energy, which is harvested, directly or indirectly, from the electric panels 101.

Preferably, the first electric power source 102 is a DC electric bus of the photovoltaic apparatus.

Conveniently, the AC electric power source 104 is adapted to provide electric energy, which is harvested, directly or indirectly, from the electric power distribution grid 200 (which is in turn fed by the photovoltaic apparatus 100).

Preferably, the second electric power source 104 is an AC electric bus of the photovoltaic apparatus.

Other types of electric power sources for the auxiliary power supply arrangement 1 may be arranged, according to the needs.

As an example, the mentioned first electric power source may comprise energy storage means (e.g. batteries, capacitor banks) operatively coupleable with a DC bus 102 of the photovoltaic apparatus to be charged by electric energy provided by the photovoltaic panels 101.

As a further example, the mentioned electric power source may comprise a voltage transformer, which is operatively coupleable with an AC bus 104 of the photovoltaic apparatus.

The auxiliary power supply arrangement 1 comprises first electronic means 11 electrically connected with the first electric power source 102.

The first electronic means 11 comprises a first electronic unit 111 adapted to receive a first feeding voltage VF1 from the first electric power source 102 and provide a first output voltage V1 of DC type.

The auxiliary power supply arrangement 1 comprises second electronic means 12 electrically connected with the second electric power source 104.

The second electronic means 12 comprise a second electronic unit 121 adapted to receive a second feeding voltage VF2 from the second electric power source 104 and provide a second output voltage V2 of DC type.

Preferably, the output voltages V1, V2 provided by the first and second electronic means 11, 12 are commensurate one with another, so that their voltage levels are quite similar.

The auxiliary power supply arrangement 1 comprises third electronic means 13 electrically connectable with the electric load 105.

The third electronic means 13 are further electrically connected with the first and second electronic means 11, 12 to receive the first and second output voltages V1, V2 from these latter.

The third electronic means 13 comprise a third electronic unit 131A, 131B, 131C adapted to select the first output voltage V1 or the second output voltage V2 and electrically connect, in a controllable manner, with the electric load 105 to feed this latter with a third output voltage V3, which is equal to or depends on the first output voltage V1 or the second output voltage V2.

In general, the third electronic unit 131A, 131B, 131C is adapted to switch among three different operation states A, B, C.

Figure 7A:
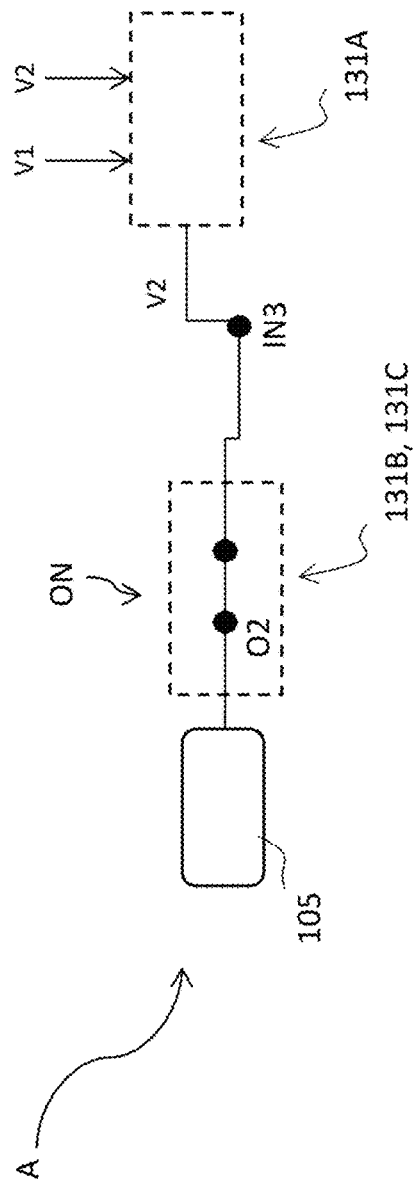
FIG. 7A illustrates a first operating state of an electronic unit.

When it is in the first operation state A, said third electronic unit selects the second output voltage V2 and feeds the electric load 105 with a third output voltage V3, which is equal to or depends on said second output voltage (FIG. 7A).

Figure 7B:
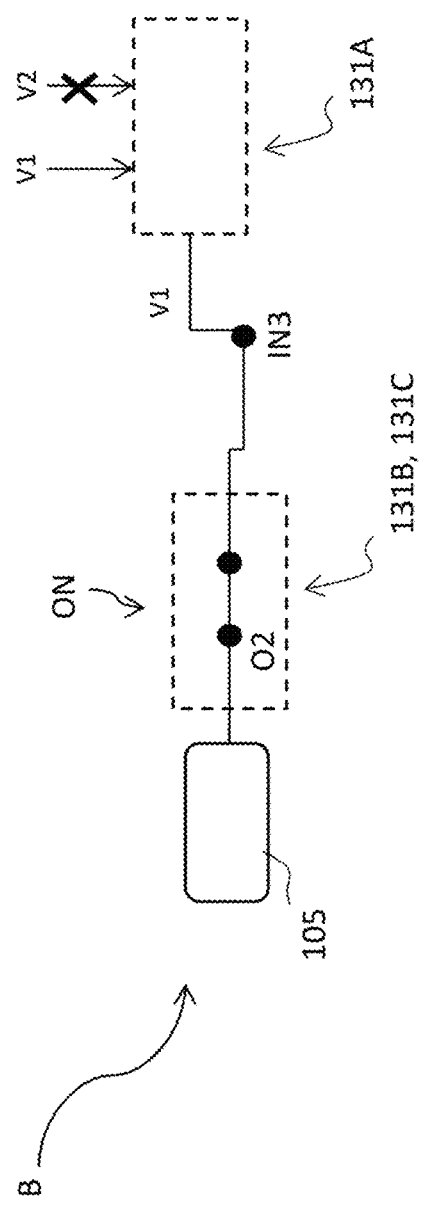
FIG. 7B illustrates a second operating state of an electronic unit.

When it is in the second operation state B, said third electronic unit selects the first output voltage V1 and feeds the electric load 105 with a third output voltage V3, which is equal to or depends on said first output voltage (FIG. 7B).

Figure 7C:
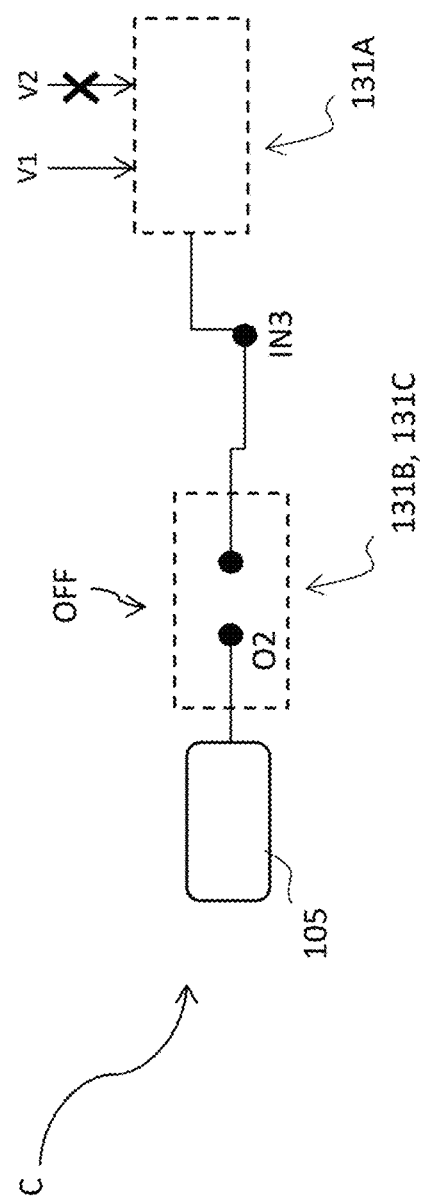
FIG. 7C illustrates a third operating state of an electronic unit.

When it is in the third operation state C, said third electronic unit interrupts the feeding of the electric load 105 e.g. by electrically disconnecting from this latter (FIG. 7C).

According to the disclosure, the third electronic unit 131A, 131B, 131C is adapted to switch from one operation state to another depending on the operating status of the first and second electric power sources (102, 104).

Preferably, said third electronic unit is adapted to switch in the first operation state A, when both said first and second electronic means 11, 12 are fed by the first and second electric power sources 102, 104 respectively, in other words when both the first and second electric power sources 102, 104 are in service.

Preferably, said third electronic unit is adapted to switch from the first operation state A to the second operation state B, when the first electronic means 11 are fed by the first electric power source 102 and the second electronic means 12 are no more fed by the second electric power source 104, in other words when the first electric power source 102 is in service and the second electric power source 104 is no more in service.

Preferably, said third electronic unit is adapted to switch from the second operation state B to the third operation state C after a given time interval (preferably adjustable), if the second electronic means 12 are not fed by the second electric power source 104 yet, in other words if the second electric power source 104 has not returned in service yet.

Preferably, the above mentioned time interval is longer than the ride-through time (e.g. 1.5 s) requested for the photovoltaic apparatus 100.

Preferably, when the electric load 105 is a protection device (e.g. a RSD device), the above mentioned time interval is also shorter than the intervention time (e.g. 10 s) requested for said protection device.

The operation of the auxiliary power supply arrangement 1 is now briefly described.

In normal conditions, when both the electric power sources 102, 104 are available (thereby being capable of feeding the first and second electronic means 11, 12, respectively), the first and second electronic unit 111, 121 provide the first and second output voltages V1, V2 to the third electronic unit 131A, 131B, 131C.

As both the output voltages V1 and V2 are available to the electronic means 13, said third electronic unit switches in the first operation state A and feeds the electric load 105 with an output voltage V3, which is equal to or depends on the second output voltage V2.

Thus, in this case, the auxiliary power supply arrangement 1 feeds the electric load 105 by using the energy provided by the AC source and without harvesting energy from the photovoltaic panels 101.

In case of outage of the AC source 104 (i.e. when this latter is no more capable of feeding the second electronic means 12), only the electric power source 102 is available as this latter is still fed (directly or indirectly) by the photovoltaic panels 101.

In this case, the first electronic unit 111 provides the first output voltages V1 to the third electronic unit 131A, 1316, 131C while the second output voltage V2 is no more available.

As only the output voltage V1 is available to the electronic means 13, said third electronic unit switches in the second operation state B and feeds the electric load 105 with an output voltage V3, which is equal to or depends on the first output voltage V1.

Thus, in this case, the auxiliary power supply arrangement 1 keeps on feeding the electric load 105 by harvesting energy from the photovoltaic panels 101.

After a given time interval (preferably longer than the ride-through time requested for the photovoltaic apparatus 100), if the AC source 104 is still not available (i.e. if this latter is still not capable of feeding the second electronic means 12), the third electronic unit 131A, 1316, 131C switches in the third operation state C and interrupts the feeding of the electric load 105.

Thus, in this case, the auxiliary power supply arrangement 1 stops feeding the electric load 105.

Of course, the third electronic unit 131A, 1316, 131C may perform state other state transitions in addition to those mentioned above.

As an example, the third electronic unit 131A, 1316, 131C may switch in the first operation state A, when the first electronic means 11 are not fed by the first electric power source 102 and the second electronic means 12 are fed by the second electric power source 104, in other words when the first electric power source 102 is not in service and the second electric power source 104 is in service.

As a further example, the third electronic unit 131A, 1316, 131C may switch from the second operation state B to the first operation state A, if the second electronic means 12 are newly fed by the second electric power source 104 within the above mentioned time interval, in other words if the second electric power source 104 returns in service within the above mentioned time interval.

Other less meaningful state transitions are possible, according to the needs.

According to a first exemplary embodiment of the disclosure, the first electronic unit comprises a first DC/DC switching converter 111 adapted to receive the first feeding voltage VF1 and provide the first output voltage V1.

The first DC/DC switching converter 111 may be of known type and will not be described in further details for the sake of brevity.

Figure 3:
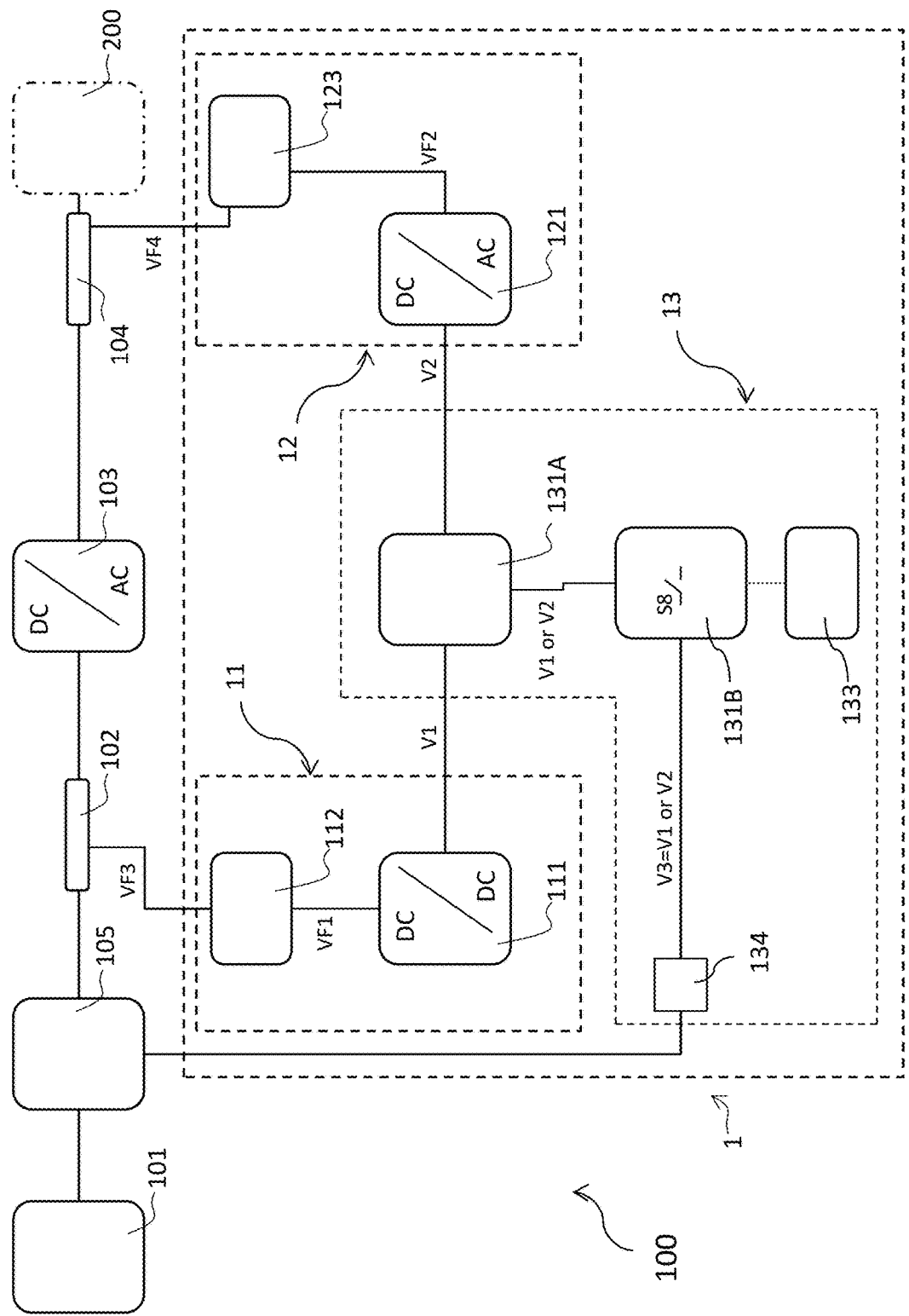
FIG. 3 illustrates an embodiment of a photovoltaic apparatus.

According to some exemplary embodiments of the disclosure (FIG. 3), the first electronic means 11 may comprise a fourth electronic unit 112 adapted to receive a third feeding voltage VF3 from the first electric power source 102 and provide the first feeding voltage VF1 to the first electronic unit 111.

Figure 5:
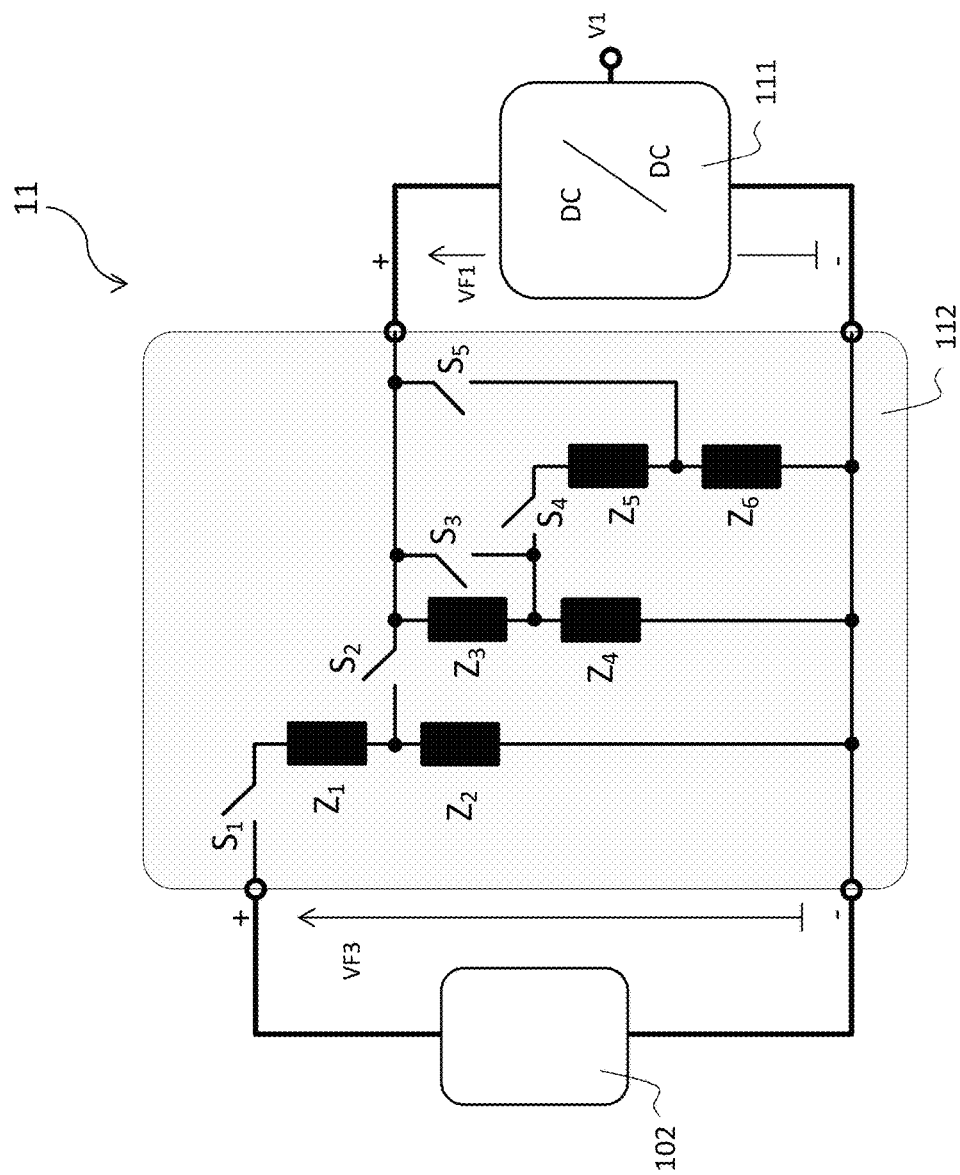
FIG. 5 illustrates an embodiment of a first electronic means.

As an example (FIG. 5), the fourth electronic unit 112 may comprise a selection circuit including a suitably arranged network of switches S1, S2, S3, S4, S5 and impedances (e.g. resistors or capacitors) Z1, Z2, Z3, Z4, Z5, Z6.

The selection circuit 112 receives the third feeding voltage VF3 as an input voltage and provides the first feeding voltage VF1 to the first electronic unit 111 by selectively activating the switches S1, S2, S3, S4, S5.

The value of the first feeding voltage VF1 depends on the value of the third feeding voltage VF3 and on the combination of impedances Z1, Z2, Z3, Z4, Z5, Z6 selected by switching the S1, S2, S3, S4, S5.

Preferably a controller circuit (not shown) or an electronic comparator circuit (not shown), selects predetermined switch combinations, which result in a suitable voltage value VF1 that does not exceed the maximum permissible voltage value of the first electronic unit 111. More preferably said controller circuit or comparator circuit selects (through a suitable switch combination of the switches S1-S5) a voltage value VF1 ensuring a maximum conversion efficiency for the electronic unit 111.

If the third feeding voltage VF3 is within the suitable voltage range of first electronic unit 111, the fourth electronic unit 112 may be omitted, therefore the first feeding voltage VF1 may substantially or equally match the third feeding voltage VF3.

In the practical implementation of the disclosure, the fourth electronic unit 112 may be a stand-alone circuit or be at least partially integrated with other components of the auxiliary power supply arrangement 1, e.g. with the first electronic unit 111.

According to some exemplary embodiments of the disclosure (FIGS. 2-3), the second electronic unit comprises an AC/DC switching converter 121 adapted to receive the second feeding voltage VF2 and provide the second output voltage V2.

The AC/DC switching converter 121 may be of known type and will not be described in further details for the sake of brevity.

According to some exemplary embodiments of the disclosure (FIG. 4), the second electronic unit comprises a rectifying circuit 122 adapted to receive the second feeding voltage VF2 and provide the second output voltage V2.

The rectifying circuit 122 may be of known type and will not be described in further details for the sake of brevity.

An example, the rectifying circuit 122 may be a suitably arranged diode bridge.

According to some exemplary embodiments of the disclosure (FIG. 3), the second electronic means 12 may comprise a fifth electronic unit 123 adapted to receive a fourth feeding voltage VF3 from the second electric power source 104 and provide the second feeding voltage VF2 to the first electronic unit 121.

As an example, the fifth electronic unit 123 may comprise a voltage transformer receiving the fourth feeding voltage VF4 as an input voltage and providing the second feeding voltage VF2 to the second electronic unit 121, 122.

In this case, the value of the second feeding voltage VF2 depends on the value of the fourth feeding voltage VF4 and on the turns ratio of the voltage transformer 123.

Preferably, the third electronic unit 131A, 131B, 131C is adapted to select the first output voltage V1 or the second output voltage V2 depending on the voltage levels of the first and second output voltages.

Preferably, in this case, the output voltage V2 is higher (more particularly slightly higher) than the first voltage V1. As an example, the first voltage V1 may be 24V whereas the second voltage V2 may be 25V.

Preferably, the above mentioned third electronic unit comprises a selection circuit 131A electrically connected with the first and second electronic means 11, 12 to receive the first and second output voltages V1, V2.

Preferably, the selection circuit 131A is adapted to:
select and provide the second output voltage V2 as an output voltage, when the second output voltage V2 is higher than the first output voltage V1;
select and provide the first output voltage V1 as an output voltage, when the first output voltage V1 is higher than the second output voltage V2.

As mentioned above, preferably, the second electronic means 12 provide a second output voltage V2 higher than the first output voltage V1 provided by the first electronic means 11. Conveniently, in this case, the selection circuit 131A is adapted to:
select and provide the second output voltage V2 as an output voltage, when both the first and second voltages V1, V2 are available (normal conditions—both the DC and the AC electric power sources 104 are in service);
select and provide the first output voltage V1 as an output voltage, when only the first output voltage V1 is available (outage of the AC electric power source 104, e.g. due to failure in the AC grid—the second output voltage V2 floats at a "low" voltage level in comparison with the first output voltage V1).

A possible embodiment of the selection circuit 131A is shown in FIG. 6.

According to this exemplary embodiment, the selection circuit 131A comprises first and second input terminals IN1, IN2, an output terminal O1, a first diode D1 having its anode electrically connected with the first input terminal IN1 and its cathode electrically connected with the output terminal O1 and a second diode D2 having its anode electrically connected with the second input terminal IN2 and its cathode electrically connected with the output terminal O1.

The first and second input terminals IN1, IN2 are adapted to receive the first and second output voltages V1, V2, respectively.

When the second output voltage V2 is higher than the first output voltage V1, the first diode D1 switches in an interdiction state whereas the second diode D2 switches in a conduction state. The first switching circuit 131 provides the second output voltage V2 as an output voltage at the output terminal O1 (FIG. 6A).

When the second output voltage V2 is lower than the first output voltage V1, the first diode D1 switches in a conduction state whereas the second diode D2 switches in an interdiction state. The first switching circuit 131 provides the first output voltage V1 as an output voltage at the output terminal O1 (FIG. 6B).

As the second electronic means 12 provide a second output voltage V2 higher than the first output voltage V1 provided by the first electronic means 11, the selection circuit 131A provides the second output voltage V2 at the output terminal O1, when both the first and second output voltages V1, V2 are available (normal conditions).

The selection circuit 131A thus provides the first output voltage V1 as an output voltage at the output terminal O1 only when the sole first output voltage V1 is available (outage of the AC source 104).

In the practical implementation of the disclosure, the selection circuit 131A may be a stand-alone circuit or be at least partially integrated with other components of the auxiliary power supply arrangement 1, e.g. with the first and second electronic units 111, 121, 122.

As an example, the diodes D1, D2 of the selection circuit 131A may be output didoes integrated with the first DC/DC switching converter 111 and with the AC/DC switching converter 121 or the rectifying circuit 122.

According to some exemplary embodiments of the disclosure (FIGS. 2-3), the above mentioned third electronic unit comprises a switching circuit 131B electrically connected with the selection circuit 131A to receive the first output voltage V1 or to the second output voltage V2 provided in output by this latter.

The switching circuit 131B is adapted to reversibly switch between a third closing state ON and an opening state OFF.

When it switches in the closing state ON, the switching circuit 131B electrically connects the selection circuit 131A with the electric load 105 and provides in output a third output voltage V3, which is equal to the first output voltage V1 or to the second output voltage V2, to feed said electric load (FIGS. 7A, 7B).

When it switches in the opening state OFF, the switching circuit 131B electrically disconnects the selection circuit 131A from the electric load 105 (FIG. 7C), thereby interrupting the feeding of this latter.

Preferably, the switching circuit 131B comprises an input terminal IN3 electrically connected with selection circuit 131A, an output terminal O3 electrically connected with the electronic load 105 and one or more suitably arranged switches S8 (e.g. a couple of switches electrically connected in series), The switching circuit 131B receives the first output voltage V1 or the second output voltage V2 at the input terminal IN3.

By properly controlling the switches s8, the switching circuit 131B can reversibly switch between the closing state ON and the opening state OFF.

As it may easily understood from above:
said third electronic unit is in the first operation state A, when the selection circuit 131A selects and provides the second output voltage V2 as an output voltage and the switching circuit 131B is in the closing state ON to feed the electric load 105 with a third output voltage V3, which is equal to or depends on said second output voltage (FIG. 7A);
said third electronic unit is in the second operation state B, when the selection circuit 131A selects and provides the second output voltage V1 as an output voltage and the switching circuit 131B is in the closing state ON to feed the electric load 105 with a third output voltage V3, which is equal to or depends on said first output voltage (FIG. 7B). By properly controlling the switching circuit 131B, said third electronic unit remains in the second operation state B for a given time interval only;
said third electronic unit is in the third operation state C, when the selection circuit 131A selects and provides the first output voltage V1 or the second output voltage V2 as an output voltage and the switching circuit 131B is in the opening state OFF to be electrically disconnected from the electric load 105 (FIG. 7C).

According to some possible embodiments of the disclosure (FIG. 4), the above mentioned third electronic unit comprises a second DC/DC switching converter 131C electrically connected with the selection circuit 131A to receive the first output voltage V1 or to the second output voltage V2 provided in output by this latter.

The switching converter 131C is adapted to reversibly switch between an activation state ON and a deactivation state OFF.

When it switches in the activation state ON, the switching converter 131C provides in output a third output voltage V3 to feed the electric load 105 (FIGS. 7A, 7B).

The third output voltage V3 depends on the first output voltage V1 or on the second output voltage V2 and its voltage level may be suitably controlled and varied according to the needs.

When it switches in the deactivation state OFF, the switching converter 131C stops feeding the electric load 105, thereby electrically disconnecting the third electronic means 13 from this latter (FIG. 7C).

Preferably, the switching converter 131C comprises input terminals IN3 electrically connected with the selection circuit 131A and output terminals O3 electrically connected with the electronic load 105.

The switching converter 131C receives the first output voltage V1 or the second output voltage V2 at the input terminals IN3.

Being properly controlled, the switching converter 131C can reversibly switch between the activation state ON and the deactivation state OFF.

As it may easily understood from above:
said third electronic unit is in the first operation state A, when the selection circuit 131A selects and provides the second output voltage V2 as an output voltage and the switching converter 131C is in the closing state ON to feed the electric load 105 with a third output voltage V3, which is equal to or depends on said second output voltage (FIG. 7A);
said third electronic unit is in the second operation state B, when the selection circuit 131A selects and provides the second output voltage V1 as an output voltage and the switching converter 131C is in the closing state ON to feed the electric load 105 with a third output voltage V3, which is equal to or depends on said first output voltage (FIG. 7B). By properly controlling the switching converter 131C, said third electronic unit remains in the second operation state B for a given time interval only;
said third electronic unit is in the third operation state C, when the selection circuit 131A selects and provides the first output voltage V1 or the second output voltage V2 as an output voltage and the switching converter 131C is in the opening state OFF to not feed the electric load 105 (FIG. 7C).

Preferably, the third electronic means 13 comprises a control unit 133 operatively associated with the third electronic unit 131A, 131B, 131C to control the operation of this latter.

When the above mentioned third control unit comprises a switching circuit 131B, the control unit 133 is adapted to generate control signals to make the switching circuit 131B to switch from the closing state ON to the opening state OFF after a time interval, when the switching circuit 131B receives the first output voltage V1 from the selection circuit 131A.

In this case, the control unit 133 may comprise a dedicated temporization circuit (e.g. a RC circuit) adapted to generate control signals to make the switching circuit 131B to switch from the closing state ON to the opening state OFF after a time interval, the duration of which may be adjusted by suitably adjusting the time constant of such a temporization circuit.

When the above mentioned third control unit comprises a DC/DC switching converter 131C, the control unit 133 may be the control unit of said switching converter and it may include suitable processing means (e.g. a microprocessor) to generate control signals to make the switching converter 131C to switch from the activation state ON to the deactivation state OFF after a time interval, the duration of which may be adjusted by suitably programming said processing means.

According to some embodiments of the disclosure (FIG. 3), the third electronic means 13 may comprise a disconnection circuit 134 adapted to disconnect the electric load 105 from third electronic unit 131A, 131B, 131C in emergency conditions.

The disconnection circuit 134 may comprise a further switching circuit (which may be of known type) configured to provide electrical disconnection from the electric load 105.

Preferably, the control unit 133 is operatively associated also with the disconnection circuit 134 to control the operation of this latter.

Figure 2:
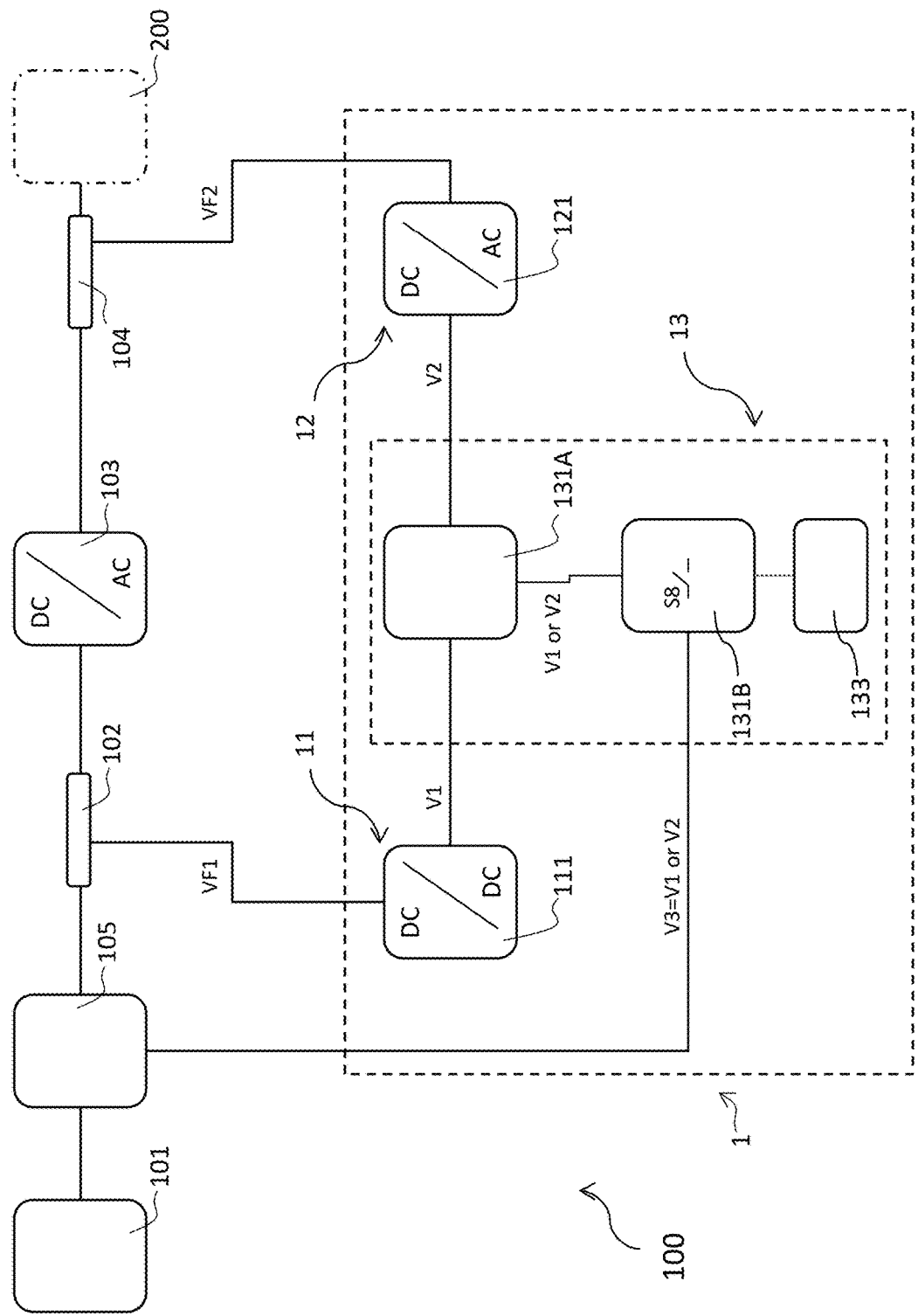
FIG. 2 illustrates an embodiment of a photovoltaic apparatus

Referring to FIG. 2, an exemplary embodiment of the auxiliary power supply arrangement 1 is shown.

According to this exemplary embodiment of the disclosure:
the first electronic means 11 are electrically connected with a DC bus 102 of the photovoltaic apparatus 100 a comprises a first DC/DC switching converter 111;
the second electronic means 12 are electrically connected with a AC bus 104 of the photovoltaic apparatus 100 a comprises an AC/DC switching converter 121;
the third electronic means 13 comprise a selection circuit 131A, a switching circuit 131B and a control unit 143 to control the operation of the switching circuit 131B;
the electric load 105 is a RSD device.

In normal conditions, when both the electric power sources 102, 104 are in service, the switching converters 111, 121 provide the first and second output voltages V1, V2 to the switching circuit 131.

Conveniently, the second output voltage V2 is higher than the first output voltage V1.

The selection circuit 131A thus normally selects and provides the second output voltage V2 as an output voltage.

The switching circuit 131B, which is normally in the closing state ON, receives in input the second output voltage V2 and ensures an electrical connection with the RSD device 105.

The switching circuit 131B provides a third output voltage V3 (which coincides with the second output voltage V2) to feed the RSD device 105.

The RSD device 105 does not intervene as it is fed by the auxiliary power supply arrangement 1.

In case of outage of the AC source 104, only the electric power source 102 (DC bus) is available as this latter is still fed by the photovoltaic panels 101.

The switching converters 111 provides the sole first output voltage V1 to the switching circuit 131 while the second output voltage V2 is no more available.

The selection circuit 131A selects and provides the first output voltage V1 as an output voltage.

The switching circuit 131B, which is still in the closing state ON, receives in input the first output voltage V2 and provides a third output voltage V3 (which coincides with the first output voltage V1) to feed the electric load 105.

The RSD device 105 does not intervene as it is still fed by the auxiliary power supply arrangement 1 (at least for a given time interval).

After a time interval longer than the ride-through time requested for the photovoltaic apparatus 100, if the electric power source 104 is still out of service, the switching circuit 131B switches in the opening state OFF and electrically disconnects the auxiliary power supply arrangement 1 from the RSD device 105. This latter is no more fed and thus intervenes to de-energize the DC section of the photovoltaic apparatus 100.

Conveniently, the mentioned time interval is shorter than the intervention time requested for the RSD device 105.

In this way, the immediate intervention of the RSD device 105 is avoided but all the technical requirements of current regulations are nevertheless fulfilled.

Figure 4:
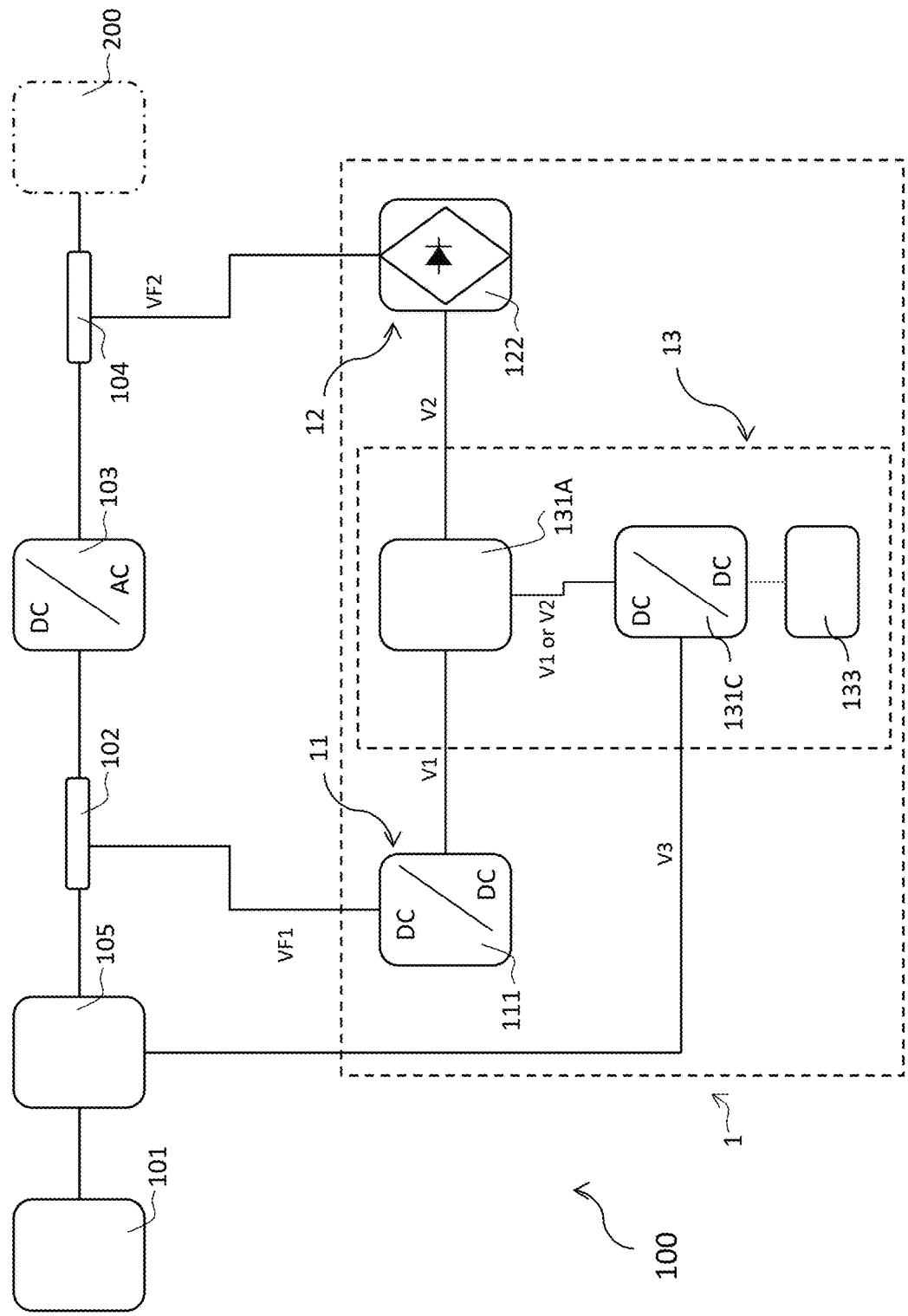
FIG. 4 illustrates an embodiment of a photovoltaic apparatus

Referring to FIG. 4, a further exemplary embodiment of the auxiliary power supply arrangement 1 is shown.

According to this embodiment of the disclosure:
the first electronic means 11 are electrically connected with a DC bus 102 of the photovoltaic apparatus 100 a comprises a first DC/DC switching converter 111;
the second electronic means 12 are electrically connected with an AC bus 104 of the photovoltaic apparatus 100 and comprises a rectifying circuit 121;
the third electronic means 13 comprise a selection circuit 131A, a second DC/DC switching converter 131C having a control unit 133 to control the operation thereof;
the electric load 105 is a RSD device.

In normal conditions, when both the electric power sources 102, 104 are in service, the switching converter 111 and the rectifying circuit 122 provide the first and second output voltages V1, V2 to the switching circuit 131.

Conveniently, the second output voltage V2 is higher than the first output voltage V1.

The selection circuit 131A normally selects and provides the second output voltage V2 as an output voltage.

The switching converter 131C, which is normally in the activation state ON, receives in input the second output voltage V2 and provides a third output voltage V3 (which depends on the second output voltage V2) to feed the RSD device 105.

The RSD device 105 does not intervene as it is fed by the auxiliary power supply arrangement 1.

In case of outage of the AC source 104, only the electric power source 102 (DC bus) is available, as this latter is still fed by the photovoltaic panels 101.

The switching converter 111 provides the sole first output voltage V1 to the switching circuit 131 while the second output voltage V2 is no more available.

The selection circuit 131A selects and provides the first output voltage V1 as an output voltage.

The switching converter 131C, which is still in activation state ON, receives in input the first output voltage V1 and provides a third output voltage V3 (which depends on the first output voltage V1) to feed the RSD device 105.

The RSD device 105 does not intervene as it is still fed by the auxiliary power supply arrangement 1 (at least for a given time interval).

After a time interval longer than the ride-through time requested for the photovoltaic apparatus 100, if the electric power source 104 is out of service, the switching converter 131C switches in the deactivation state OFF and stops feeding the RSD device 105, which thus intervenes to de-energize the DC section of the photovoltaic apparatus 100.

Conveniently, the mentioned time interval is shorter than the intervention time requested for the RSD device.

In this way, the immediate intervention of the RSD device 105 is avoided but all the technical requirements of current regulations are nevertheless fulfilled.

The photovoltaic apparatus, according to the disclosure, comprises an auxiliary power supply arrangement, which allows it to operate for at least the required ride-through time in case of voltage dips or outages of the AC source normally feeding the electric loads of said apparatus.

The photovoltaic apparatus, according to the disclosure, comprises an auxiliary power supply arrangement having a particularly simple and compact structure, which can be easily integrated with other parts of the photovoltaic apparatus, e.g. with the inverter section thereof, with consequent relevant advantages in terms of size and cost reduction with respect to known solutions of the state of the art.

As an example, in the practical implementation of the disclosure, the auxiliary power supply arrangement may be integrated in the electronic board of the main switching converter of the photovoltaic apparatus.

The photovoltaic apparatus, according to the disclosure, can be easily manufactured at industrial level at competitive costs with respect to known solutions of the state of the art.

In one aspect the present application provides a photovoltaic apparatus comprising an auxiliary power supply arrangement adapted to feed an electric load of said photovoltaic apparatus, said auxiliary power supply arrangement comprising: first electronic means electrically connected with a first electric power source of DC type, said first electronic means comprising a first electronic unit adapted to receive a first feeding voltage and provide a first output voltage of DC type, second electronic means electrically connected with a second electric power source of AC type, said second electronic means comprising a second electronic unit adapted to receive a second feeding voltage and provide a second output voltage of DC type, third electronic means electrically connectable with said electric load and electrically connected with said first and second electronic means to receive said first and second output voltages from said first and second electronic means, said third electronic means comprising a third electronic unit adapted to reversibly switch among: a first operation state at which said third electronic unit selects said second output voltage and feeds said electric load with a third output voltage, which is equal to or depends on said second output voltage, a second operation state at which said third electronic unit selects said first output voltage and feeds said electric load with a third output voltage which is equal to or depends on said first output voltage, a third operation state at which said third electronic unit interrupts the feeding of said electric load, said third electronic unit being adapted to switch from one operation state to another depending on the operating status of said first and second electric power sources.

A feature of the present application includes wherein said third electronic unit is adapted to: switch in said first operation state when both said first and second electric power sources are in service, switch from said first operation state to said second operation state if said second electric power source is no more in service, switch from said second operation state to said third operation state after a given time interval, if said second electric power source has not returned in service yet.

Another feature of the present application includes wherein said first electric power source comprises a DC electric bus of said photovoltaic apparatus.

Yet another feature of the present application includes wherein said second electric power source comprises an AC electric bus of said photovoltaic apparatus.

Still another feature of the present application includes wherein said first electronic means comprise a fourth electronic unit adapted to receive a third feeding voltage from said first electric power source and provide said first feeding voltage to said first electronic unit.

Yet still another feature of the present application includes wherein said second electronic means comprise a fifth electronic unit adapted to receive a fourth feeding voltage from said second electric power source and provide said second feeding voltage to said second electronic unit.

Still yet another feature of the present application includes wherein said first electronic unit comprises a first DC/DC switching converter adapted to receive said first feeding voltage and provide said first output voltage.

A further feature of the present application includes wherein said second electronic unit comprises an AC/DC switching converter adapted to receive said second feeding voltage and provide said second output voltage.

A still further feature of the present application includes wherein said second electronic unit comprises a rectifying circuit adapted to receive said second feeding voltage and provide said second output voltage.

A yet still further feature of the present application includes wherein said third electronic unit is adapted to select said first output voltage or said second output voltage depending on the voltage levels of said first and second output voltages.

Still another feature of the present application includes wherein said third electronic unit comprises a selection circuit electrically connected with said first and second electronic means to receive said first and second output voltages, said selection circuit being adapted to provide in output said second output voltage, when said second output voltage is higher than said first output voltage or said first output voltage when said second output voltage is lower than said first output voltage.

A still further feature of the present application includes wherein said third electronic unit comprises a switching circuit electrically connected with said selection circuit to receive said first output voltage or said second output voltage, said switching circuit being adapted to reversibly switch between a closing state at which said second switching circuit electrically connects said selection circuit with said electric load to feed said electric load with a third output voltage, which is equal to said first output voltage or said second output voltage, and an opening state at which said switching circuit electrically disconnects said selection circuit from said electric load.

A still further feature of the present application includes wherein said third electronic unit comprises a second DC/DC switching converter electrically connected with said selection circuit to receive said first output voltage or said second output voltage, said second DC/DC switching converter being adapted to reversibly switch between an activation state at which said second DC/DC switching converter feeds said electric load with a third output voltage which depends on said first output voltage or on said second output voltage, and a deactivation state at which said second DC/DC switching converter stops feeding said electric load.

A still further feature of the present application includes wherein said electric load comprises a protection device of said photovoltaic apparatus adapted to perform a de-energization of a DC section of said photovoltaic apparatus.

Another aspect of the present application includes an auxiliary power supply arrangement for a photovoltaic apparatus, wherein the auxiliary power supply arrangement comprises: first electronic means electrically connectable with a first electric power source of DC type, said first electronic means comprising a first electronic unit adapted to receive a first feeding voltage and provide a first output voltage of DC type, second electronic means electrically connectable with a second electric power source of AC type, said second electronic means comprising a second electronic unit adapted to receive a second feeding voltage and provide a second output voltage of DC type, third electronic means electrically connectable with said electric load and electrically connected with said first and second electronic means to receive said first and second output voltages from said first and second electronic means, said third electronic means comprising a third electronic unit adapted to reversibly switch among: a first operation state at which said third electronic unit selects said second output voltage and feeds said electric load with a third output voltage which is equal to or depends on said second output voltage, a second operation state at which said third electronic unit selects said first output voltage and feeds said electric load with a third output voltage which is equal to or depends on said first output voltage, a third operation state at which said third electronic unit interrupts the feeding of said electric load, said third electronic unit being adapted to switch from one operation state to another depending on the operating status of said first and second electric power sources.

In one aspect the present application provides a photovoltaic apparatus comprising an auxiliary power supply arrangement adapted to feed an electric load of said photovoltaic apparatus, said auxiliary power supply arrangement comprising: first electronic subsystem electrically connected with a first electric power source of DC type, said first electronic subsystem comprising a first electronic unit adapted to receive a first feeding voltage and provide a first output voltage of DC type, second electronic subsystem electrically connected with a second electric power source of AC type, said second electronic subsystem comprising a second electronic unit adapted to receive a second feeding voltage and provide a second output voltage of DC type, third electronic subsystem electrically connectable with said electric load and electrically connected with said first and second electronic subsystems to receive said first and second output voltages from said first and second electronic subsystems, said third electronic subsystem comprising a third electronic unit adapted to reversibly switch among: a first operation state at which said third electronic unit selects said second output voltage and feeds said electric load with a third output voltage, which is equal to or depends on said second output voltage, a second operation state at which said third electronic unit selects said first output voltage and feeds said electric load with a third output voltage which is equal to or depends on said first output voltage, a third operation state at which said third electronic unit interrupts the feeding of said electric load, said third electronic unit being adapted to switch from one operation state to another depending on the operating status of said first and second electric power sources.

A feature of the present application includes wherein said third electronic unit is adapted to: switch in said first operation state when both said first and second electric power sources are in service, switch from said first operation state to said second operation state if said second electric power source is no more in service, switch from said second operation state to said third operation state after a given time interval, if said second electric power source has not returned in service yet.

Another feature of the present application includes wherein said first electric power source comprises a DC electric bus of said photovoltaic apparatus.

Yet another feature of the present application includes wherein said second electric power source comprises an AC electric bus of said photovoltaic apparatus.

Still another feature of the present application includes wherein said first electronic subsystem comprise a fourth electronic unit adapted to receive a third feeding voltage from said first electric power source and provide said first feeding voltage to said first electronic unit.

Yet still another feature of the present application includes wherein said second electronic subsystem comprise a fifth electronic unit adapted to receive a fourth feeding voltage from said second electric power source and provide said second feeding voltage to said second electronic unit.

Still yet another feature of the present application includes wherein said first electronic unit comprises a first DC/DC switching converter adapted to receive said first feeding voltage and provide said first output voltage.

A further feature of the present application includes wherein said second electronic unit comprises an AC/DC switching converter adapted to receive said second feeding voltage and provide said second output voltage.

A still further feature of the present application includes wherein said second electronic unit comprises a rectifying circuit adapted to receive said second feeding voltage and provide said second output voltage.

A yet still further feature of the present application includes wherein said third electronic unit is adapted to select said first output voltage or said second output voltage depending on the voltage levels of said first and second output voltages.

Still another feature of the present application includes wherein said third electronic unit comprises a selection circuit electrically connected with said first and second electronic subsystems to receive said first and second output voltages, said selection circuit being adapted to provide in output said second output voltage, when said second output voltage is higher than said first output voltage or said first output voltage when said second output voltage is lower than said first output voltage.

A still further feature of the present application includes wherein said third electronic unit comprises a switching circuit electrically connected with said selection circuit to receive said first output voltage or said second output voltage, said switching circuit being adapted to reversibly switch between a closing state at which said second switching circuit electrically connects said selection circuit with said electric load to feed said electric load with a third output voltage, which is equal to said first output voltage or said second output voltage, and an opening state at which said switching circuit electrically disconnects said selection circuit from said electric load.

A still further feature of the present application includes wherein said third electronic unit comprises a second DC/DC switching converter electrically connected with said selection circuit to receive said first output voltage or said second output voltage, said second DC/DC switching converter being adapted to reversibly switch between an activation state at which said second DC/DC switching converter feeds said electric load with a third output voltage which depends on said first output voltage or on said second output voltage, and a deactivation state at which said second DC/DC switching converter stops feeding said electric load.

A still further feature of the present application includes wherein said electric load comprises a protection device of said photovoltaic apparatus adapted to perform a de-energization of a DC section of said photovoltaic apparatus.

Another aspect of the present application includes an auxiliary power supply arrangement for a photovoltaic apparatus, wherein the auxiliary power supply arrangement comprises: first electronic subsystem electrically connectable with a first electric power source of DC type, said first electronic subsystem comprising a first electronic unit adapted to receive a first feeding voltage and provide a first output voltage of DC type, second electronic subsystem electrically connectable with a second electric power source of AC type, said second electronic subsystem comprising a second electronic unit adapted to receive a second feeding voltage and provide a second output voltage of DC type, third electronic subsystem electrically connectable with said electric load and electrically connected with said first and second electronic subsystems to receive said first and second output voltages from said first and second electronic subsystems, said third electronic subsystem comprising a third electronic unit adapted to reversibly switch among: a first operation state at which said third electronic unit selects said second output voltage and feeds said electric load with a third output voltage which is equal to or depends on said second output voltage, a second operation state at which said third electronic unit selects said first output voltage and feeds said electric load with a third output voltage which is equal to or depends on said first output voltage, a third operation state at which said third electronic unit interrupts the feeding of said electric load, said third electronic unit being adapted to switch from one operation state to another depending on the operating status of said first and second electric power sources.

The invention claimed is:
1. A photovoltaic apparatus comprising an auxiliary power supply arrangement adapted to feed an electric load of said photovoltaic apparatus,
wherein said photovoltaic apparatus comprises a DC section including one or more photovoltaic panels and a DC electric bus, an AC section including an AC electric bus electrically connected with an electric power distribution grid fed by said photovoltaic apparatus, and an inverter section electrically connected with said DC electric bus and said AC electric bus,
wherein said electric load comprises a protection device adapted to perform the de-energization of said DC electric bus,
said auxiliary power supply arrangement comprising:
first electronic means electrically connected with a first electric power source of DC type formed by said DC electric bus, said first electronic means comprising a first electronic unit adapted to receive a first feeding voltage and provide a first output voltage of DC type;
second electronic means electrically connected with a second electric power source of AC type formed by said AC electric bus, said second electronic means comprising a second electronic unit adapted to receive a second feeding voltage and provide a second output voltage of DC type;
third electronic means electrically connectable with said electric load and electrically connected with said first and second electronic means to receive said first and second output voltages from said first and second electronic means, said third electronic means comprising a third electronic unit adapted to reversibly switch among:
a first operation state at which said third electronic unit selects said second output voltage and feeds said electric load with a third output voltage, which is equal to or depends on said second output voltage;
a second operation state at which said third electronic unit selects said first output voltage and feeds said electric load with a third output voltage which is equal to or depends on said first output voltage;
a third operation state at which said third electronic unit interrupts the feeding of said electric load;
said third electronic unit being adapted to switch from one operation state to another depending on the operating status of said first and second electric power sources;
wherein said third electronic unit is adapted to:
switch in said first operation state when both said first and second electric power sources are in service;
switch from said first operation state to said second operation state if said second electric power source is no more in service;
switch from said second operation state to said third operation state after a given time interval, if said second electric power source has not returned in service yet;
wherein said time interval is shorter than an intervention time requested for said protection device.
2. Said photovoltaic apparatus according claim 1 wherein said third electronic unit is adapted to:
switch in said first operation state when both said first and second electric power sources are in service;
switch from said first operation state to said second operation state if said second electric power source is no more in service;
switch from said second operation state to said third operation state after a given time interval, if said second electric power source has not returned in service yet.
3. Said photovoltaic apparatus according to claim 1 wherein said first electric power source comprises a DC electric bus of said photovoltaic apparatus.
4. Said photovoltaic apparatus according to claim 1 wherein said second electric power source comprises an AC electric bus of said photovoltaic apparatus.
5. Said photovoltaic apparatus according to claim 1 wherein said first electronic means comprise a fourth electronic unit adapted to receive a third feeding voltage from said first electric power source and provide said first feeding voltage to said first electronic unit.
6. Said photovoltaic apparatus according to claim 5 wherein said second electronic means comprise a fifth electronic unit adapted to receive a fourth feeding voltage from said second electric power source and provide said second feeding voltage to said second electronic unit.
7. Said photovoltaic apparatus according to claim 1 wherein said first electronic unit comprises a first DC/DC switching converter adapted to receive said first feeding voltage and provide said first output voltage.
8. Said photovoltaic apparatus, according to claim 1 wherein said second electronic unit comprises an AC/DC switching converter adapted to receive said second feeding voltage and provide said second output voltage.
9. Said photovoltaic apparatus according to claim 1 wherein said second electronic unit comprises a rectifying circuit adapted to receive said second feeding voltage and provide said second output voltage.
10. Said photovoltaic apparatus according to claim 1 wherein said third electronic unit is adapted to select said first output voltage or said second output voltage depending on the voltage levels of said first and second output voltages.
11. Said photovoltaic apparatus according claim 10 wherein said third electronic unit comprises a selection circuit electrically connected with said first and second electronic means to receive said first and second output voltages, said selection circuit being adapted to provide in output said second output voltage, when said second output voltage is higher than said first output voltage or said first output voltage when said second output voltage is lower than said first output voltage.

12. Said photovoltaic apparatus, according to claim 11 wherein said third electronic unit comprises a switching circuit electrically connected with said selection circuit to receive said first output voltage or said second output voltage, said switching circuit being adapted to reversibly switch between a closing state at which said second switching circuit electrically connects said selection circuit with said electric load to feed said electric load with a third output voltage, which is equal to said first output voltage or said second output voltage, and an opening state at which said switching circuit electrically disconnects said selection circuit from said electric load.

13. Said photovoltaic apparatus, according to claim 11 wherein said third electronic unit comprises a second DC/DC switching converter electrically connected with said selection circuit to receive said first output voltage or said second output voltage, said second DC/DC switching converter being adapted to reversibly switch between an activation state at which said second DC/DC switching converter feeds said electric load with a third output voltage which depends on said first output voltage or on said second output voltage, and a deactivation state at which said second DC/DC switching converter stops feeding said electric load.

14. Said photovoltaic apparatus, according to claim 1 wherein said electric load comprises a protection device of said photovoltaic apparatus adapted to perform a de-energization of a DC section of said photovoltaic apparatus.

15. An auxiliary power supply arrangement for a photovoltaic apparatus,
wherein said photovoltaic apparatus comprises a DC section including one or more photovoltaic panels and a DC electric bus, an AC section including an AC electric bus electrically connected with an electric power distribution grid fed by said photovoltaic apparatus, and an inverter section electrically connected with said DC electric bus and said AC electric bus,
wherein said electric load comprises a protection device adapted to perform the de-energization of said DC electric bus,
wherein the auxiliary power supply arrangement comprises:
first electronic means electrically connectable with a first electric power source of DC type, said first electronic means comprising a first electronic unit adapted to receive a first feeding voltage and provide a first output voltage of DC type;
second electronic means electrically connectable with a second electric power source of AC type, said second electronic means comprising a second electronic unit adapted to receive a second feeding voltage and provide a second output voltage of DC type;
third electronic means electrically connectable with said electric load and electrically connected with said first and second electronic means to receive said first and second output voltages from said first and second electronic means, said third electronic means comprising a third electronic unit adapted to reversibly switch among:
a first operation state at which said third electronic unit selects said second output voltage and feeds said electric load with a third output voltage which is equal to or depends on said second output voltage;
a second operation state at which said third electronic unit selects said first output voltage and feeds said electric load with a third output voltage which is equal to or depends on said first output voltage;
a third operation state at which said third electronic unit interrupts the feeding of said electric load;
said third electronic unit being adapted to switch from one operation state to another depending on the operating status of said first and second electric power sources;
wherein said third electronic unit is adapted to:
switch in said first operation state when both said first and second electric power sources are in service;
switch from said first operation state to said second operation state if said second electric power source is no more in service;
switch from said second operation state to said third operation state after a given time interval, if said second electric power source has not returned in service yet;
wherein said time interval is shorter than an intervention time requested for said protection device.

* * * * *